United States Patent [19]

Maley

[11] Patent Number: 5,449,119
[45] Date of Patent: Sep. 12, 1995

[54] MAGNETICALLY ADJUSTABLE VALVE ADAPTED FOR A FUEL INJECTOR

[75] Inventor: Dale C. Maley, Fairbury, Ill.

[73] Assignee: Caterpillar Inc., Peoria, Ill.

[21] Appl. No.: 248,956

[22] Filed: May 25, 1994

[51] Int. Cl.$^6$ .............................................. F02M 47/02
[52] U.S. Cl. ................................. 239/88; 251/129.18; 251/129.16
[58] Field of Search ................................... 239/88–96; 251/129.18, 129.16; 335/220, 229, 253, 266, 268

[56] References Cited

U.S. PATENT DOCUMENTS

| | | | |
|---|---|---|---|
| 2,144,862 | 1/1939 | Truxell, Jr. | 239/88 |
| 2,421,329 | 5/1947 | Hoffer | 210/166 |
| 2,434,586 | 1/1948 | Reynolds | 31/58 |
| 2,512,557 | 6/1950 | Weldy | 239/453 |
| 2,535,937 | 12/1950 | Bozec et al. | 239/533.12 X |
| 2,552,445 | 5/1951 | Nielsen | 239/456 |
| 2,597,952 | 5/1952 | Rosenlund | 137/139 |
| 2,621,011 | 12/1952 | Smith | 251/27 |
| 2,672,827 | 3/1954 | McGowen, Jr. | 103/232 |
| 2,727,498 | 12/1955 | Reiners | 123/32 |
| 2,749,181 | 6/1956 | Maxwell et al. | 239/584 |
| 2,916,048 | 12/1959 | Gunkel | 137/544 |
| 3,035,780 | 5/1962 | Peras | 239/453 |
| 3,057,560 | 10/1962 | Campbell | 239/464 |
| 3,071,714 | 1/1963 | Hadekel | 317/172 |
| 3,175,771 | 3/1965 | Bréting | 239/533 |
| 3,410,519 | 11/1968 | Evans | 251/141 |
| 3,532,121 | 10/1970 | Sturman et al. | 137/625.4 |
| 3,570,806 | 3/1971 | Sturman et al. | 251/65 |
| 3,570,807 | 3/1971 | Sturman et al. | 251/65 |
| 3,570,833 | 3/1971 | Sturman et al. | 267/161 |
| 3,585,547 | 6/1971 | Sturman | 335/227 |
| 3,604,959 | 9/1971 | Sturman et al. | 310/12 |
| 3,675,853 | 7/1972 | Lapera | 239/464 |
| 3,683,239 | 8/1972 | Sturman | 317/150 |
| 3,743,898 | 7/1973 | Sturman | 317/154 |
| 3,753,547 | 8/1973 | Topham | 251/120 |

(List continued on next page.)

FOREIGN PATENT DOCUMENTS

| | | |
|---|---|---|
| 0425236A1 | 5/1991 | European Pat. Off. |
| 0246373B1 | 3/1992 | European Pat. Off. |
| 981664 | 12/1982 | U.S.S.R. |

OTHER PUBLICATIONS

Frankl, et al., "Electronic Unit Injectors-Revised," *SAE Technical Paper Series*, 40th Annual Earthmoving Industry Conference, Peoria, Illinois, (Apr. 11–13, 1989).

Roters, "Electromagnetic Devices," First Edition, pp. 44–45, 67, 70.

Sturman, "Breakthrough in Digital Valves," *Machine Design*, vol. 66, No. 4, dated Feb. 21, 1994, pp. 37–42.

*Primary Examiner*—Andres Kashnikow
*Assistant Examiner*—Lesley D. Morris
*Attorney, Agent, or Firm*—Marshall, O'Toole, Gerstein, Murray & Borun

[57] ABSTRACT

A solenoid actuator, adapted for use in an electronic control valve for a fuel injector, having an electrically-energizable electromagnetic device, such as a winding, a first pole member associated with the electrically energizable winding, and an armature movable with respect to the first pole member in a linear direction. The armature occupies a first position relative to the first pole member when the winding is not electrically energized and a second position relative to the first pole member when the winding is electrically energized. The actuator has a second pole member which is movable with respect to the first pole member in the linear direction so as to form an air gap of variable width between the first and second pole members to change the magnetic characteristics of the solenoid actuator, and thus the response of the actuator. The second pole member is movable to a position relative to the first pole member in which the second pole member is spaced from the first pole member, and biasing means are provided for maintaining the relative position of the first and second pole members. The biasing means may be provided as a spring for urging the second pole member towards the first pole member and adjustable stop means, such as a screw, disposed in contact with the second pole member.

19 Claims, 2 Drawing Sheets

U.S. PATENT DOCUMENTS

| | | | |
|---|---|---|---|
| 3,814,376 | 6/1974 | Reinicke | 251/65 |
| 3,821,967 | 7/1974 | Sturman et al. | 137/624.15 |
| 3,835,829 | 9/1974 | Links | 123/139 E |
| 3,858,135 | 12/1974 | Gray | 335/266 |
| 3,989,066 | 11/1976 | Sturman et al. | 137/624.2 |
| 4,087,736 | 5/1978 | Mori et al. | 322/28 |
| 4,087,773 | 5/1978 | Jencks et al. | 335/243 |
| 4,107,546 | 8/1978 | Sturman et al. | 307/141 |
| 4,108,419 | 8/1978 | Sturman et al. | 251/30 |
| 4,114,647 | 9/1978 | Sturman et al. | 137/624.2 |
| 4,114,648 | 9/1978 | Nakajima et al. | 137/625.5 |
| 4,120,456 | 10/1978 | Kimura et al. | 239/464 |
| 4,152,676 | 5/1979 | Morgenthaler et al. | 333/24.1 |
| 4,189,816 | 2/1980 | Chalansonnet | 29/148.4 |
| 4,192,466 | 3/1980 | Tanasawa et al. | 239/464 |
| 4,231,525 | 11/1980 | Palma | 239/585 |
| 4,248,270 | 2/1981 | Ostrowski | 138/45 |
| 4,266,727 | 5/1981 | Happel et al. | 239/409 |
| 4,273,291 | 6/1981 | Müller | 239/533.12 |
| 4,275,693 | 6/1981 | Leckie | 123/447 |
| 4,308,891 | 1/1982 | Loup | 137/551 |
| 4,354,662 | 10/1982 | Thompson | 251/129 |
| 4,375,274 | 3/1983 | Thoma et al. | 239/117 |
| 4,392,612 | 7/1983 | Deckard et al. | 239/88 |
| 4,396,037 | 8/1983 | Wilcox | 137/625.65 |
| 4,409,638 | 10/1983 | Sturman et al. | 361/152 |
| 4,482,094 | 11/1984 | Knape | 239/88 |
| 4,501,290 | 2/1985 | Sturman et al. | 137/495 |
| 4,516,600 | 5/1985 | Sturman et al. | 137/495 |
| 4,518,147 | 5/1985 | Andresen et al. | 251/121 |
| 4,526,519 | 7/1985 | Mowbray et al. | 417/490 |
| 4,541,454 | 9/1985 | Sturman et al. | 137/505.41 |
| 4,558,844 | 12/1985 | Donahue, Jr. | 251/118 |
| 4,610,428 | 9/1986 | Fox | 251/129.16 |
| 4,653,455 | 3/1987 | Eblen et al. | 123/506 |
| 4,658,824 | 4/1987 | Scheibe | 123/472 |
| 4,702,212 | 10/1987 | Best et al. | 123/472 |
| 4,721,253 | 1/1988 | Noguchi et al. | 239/464 |
| 4,753,416 | 6/1988 | Inagaki et al. | 251/129.15 |
| 4,794,890 | 1/1989 | Richeson, Jr. | 123/90.11 |
| 4,811,221 | 3/1989 | Sturman et al. | 364/420 |
| 4,812,884 | 3/1989 | Mohler | 335/258 |
| 4,813,599 | 3/1989 | Greiner et al. | 239/456 |
| 4,831,989 | 5/1989 | Haines | 123/506 |
| 4,846,440 | 7/1989 | Carlson et al. | 251/129.17 |
| 4,875,499 | 10/1989 | Fox | 137/82 |
| 4,893,102 | 1/1990 | Bauer | 335/132 |
| 4,893,652 | 1/1990 | Nogle et al. | 137/596.17 |
| 4,928,887 | 5/1990 | Miettaux | 239/584 |
| 4,964,571 | 10/1990 | Taue et al. | 239/88 |
| 4,993,637 | 2/1991 | Kanesaka | 239/96 |
| 5,004,577 | 4/1991 | Ward | 264/112 |
| 5,042,445 | 8/1991 | Peters et al. | 123/446 |
| 5,049,971 | 9/1991 | Krumm | 357/55 |
| 5,050,543 | 9/1991 | Kawamura | 123/90.11 |
| 5,110,087 | 5/1992 | Studtmann et al. | 251/129.16 |
| 5,121,730 | 6/1992 | Ausman et al. | 123/467 |
| 5,131,624 | 7/1992 | Kreuter et al. | 251/129.18 |
| 5,161,779 | 11/1992 | Graner et al. | 251/129.16 |
| 5,188,336 | 2/1993 | Graner et al. | 251/129.16 |

MAGNETICALLY ADJUSTABLE VALVE ADAPTED FOR A FUEL INJECTOR

TECHNICAL FIELD

The present invention relates generally to fuel injection systems and, more particularly, to magnetically adjustable control valves adapted for fuel injectors.

BACKGROUND ART

In conventional fuel injection systems, the fuel injectors may be mechanically, hydraulically, or electrically actuated. In hydraulically-actuated systems, the pumping assembly which periodically causes fuel to be injected into the engine cylinders is hydraulically driven by pressurized actuating fluid which is selectively communicated to the pumping assembly by an electronically-controlled valve. One example of a hydraulically-actuated, electronically-controlled fuel injection system is disclosed in U.S. Pat. No. 5,121,730 to Ausman, et al.

In mechanically-actuated systems, the pumping assembly is mechanically coupled to a cam driven by the engine so that the pumping assembly is actuated in synchronism with the rotation of the cam. The precise timing and duration of injection is determined by an electronically-controlled valve associated with the pumping assembly. Typically, the electronically-controlled valve is a solenoid valve.

In multi-cylinder engines in which such fuel injection systems are incorporated, it is important for optimization of the engine performance and emissions that the fuel injection characteristics for each engine cylinder are the same. The fuel injection characteristics include when fuel injection begins, the duration of injection, and the quantity of fuel injected.

In the past, uniformity of the fuel injection characteristics from cylinder to cylinder has been accomplished by adjusting the response of the solenoid valve associated with each fuel injector once when the engine is manufactured. Such a solenoid valve includes an armature, a pole member, and a spring which biases the armature away from the pole member. When such a valve is energized, the force of the spring pre-load must be overcome before the armature is urged towards the pole member. The valve response has been adjusted by changing the pre-load of the spring, which can be accomplished by changing the initial compression of the spring with one or more relatively thin inserts or shims.

For example, when a relatively thick shim is used to increase the initial compression of the spring, the solenoid valve takes longer to operate since a greater spring force must be overcome. When a relatively thin shim is used to decrease the initial compression of the spring, the solenoid valve operates more quickly since the spring force which must be overcome is less.

The practice of tuning a solenoid valve by adding, removing and/or changing shims is tedious and time consuming. For each fuel injector in the engine, such a procedure may require assembly of the injector, testing of the injector, disassembly of the injector to add or remove a shim, reassembly of the injector, testing of the injector, etc. Because of the time and effort required to disassemble and reassemble the fuel injector to change a shim, the fuel injectors are adjusted until a minimum, but not an optimal, performance threshold is achieved.

DISCLOSURE OF THE INVENTION

The invention is directed to a solenoid actuator, adapted for use in an electronic control valve for a fuel injector, having an electrically-energizable electromagnetic device, such as a winding, a first pole member associated with the electrically energizable winding, and an armature movable with respect to the first pole member in a linear direction. The armature occupies a first position relative to the first pole member when the winding is not electrically energized and a second position relative to the first pole member when the winding is electrically energized.

The actuator has a second pole member which is movable with respect to the first pole member in the linear direction so as to form an air gap of variable width between the first and second pole members to change the magnetic characteristics of the solenoid actuator, and thus the response of the actuator.

The second pole member is movable to a position relative to the first pole member in which the second pole member is spaced from the first pole member, and biasing means are provided for maintaining the relative position of the first and second pole members. The biasing means may be provided as a spring for urging the second pole member towards the first pole member and adjustable stop means, such as a screw, disposed in contact with the second pole member.

The solenoid actuator may be provided as part of an electronic control valve in a fuel injector having a fuel injector body, a fuel inlet formed in the fuel injector body, pump means disposed in the fuel injector body and being supplied with fuel from the fuel inlet, and a nozzle valve disposed in the fuel injector body and being provided fuel from the pump means. The nozzle valve may occupy an open position when the fuel provided by the pump means is above a threshold fuel pressure and a closed position when the fuel provided by the pump means is below a threshold fuel pressure.

The electronic control valve is fluidly connected to the pump means and has a first position in which fuel in the pump means may be pressurized to the threshold fuel pressure and a second position which prevents fuel in the pump means from being pressurized to the threshold pressure.

Adjustment of the solenoid actuator in accordance with the invention does not require repeated assembly and disassembly of the actuator, but may be performed after the actuator is assembled without the need to disassemble the actuator.

BEST MODE FOR CARRYING OUT THE INVENTION

Figure 1:
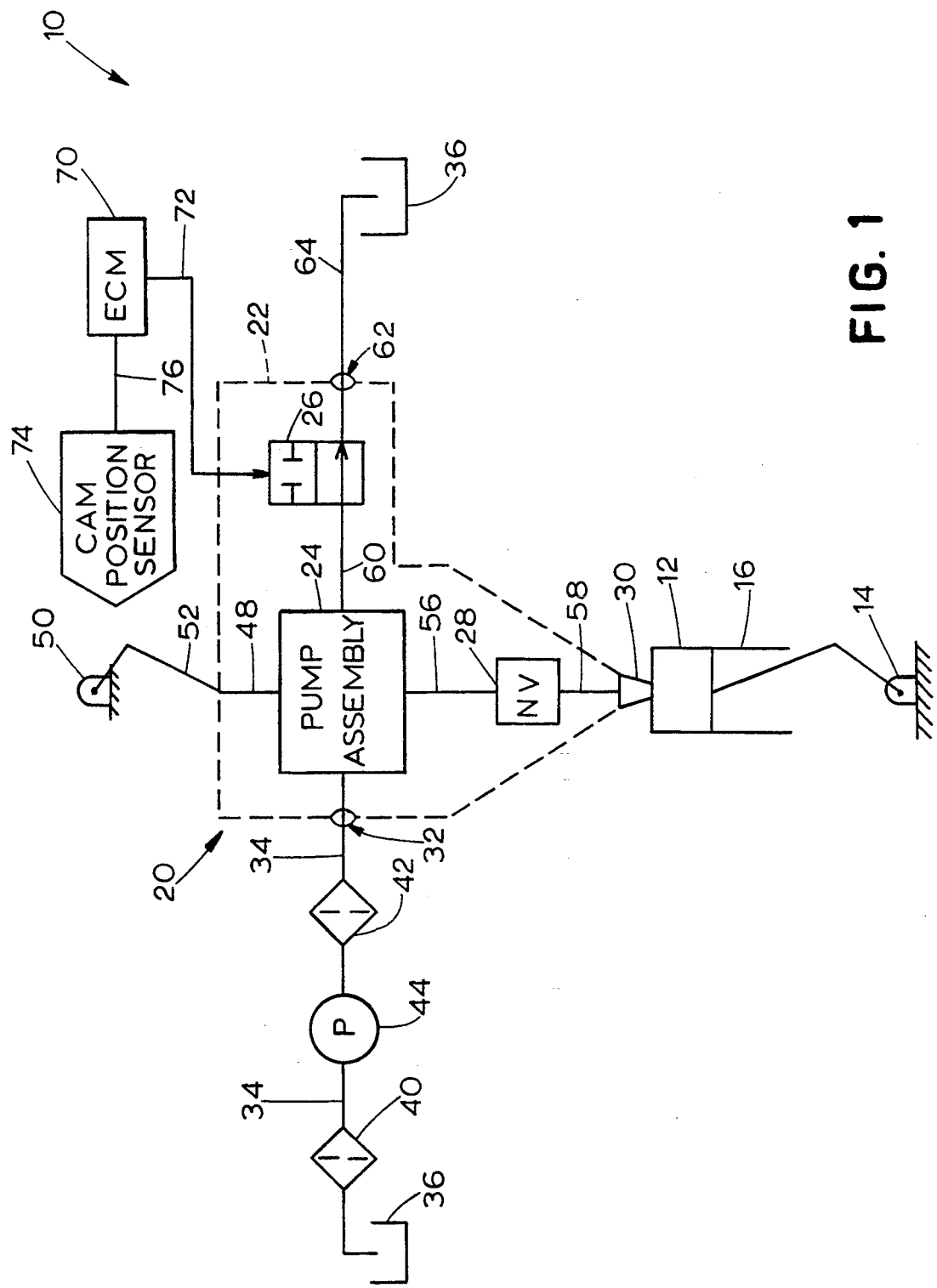
FIG. 1 is a schematic diagram illustrating a mechanically-actuated electronically-controlled unit injector fuel system having a fuel injector with an electronic control valve.

One embodiment of a mechanically-actuated electronically-controlled unit injector ("MEUI") fuel system 10 is illustrated in FIG. 1. The fuel injection system 10 is adapted for a diesel-cycle, direct-injection internal combustion engine having a number of engine pistons 12, one of which is shown attached to an engine crank 14 and disposed for reciprocating movement in an engine cylinder 16.

Fuel is injected into the cylinder 16 by a fuel injector 20 having a fuel injector body schematically designated by dotted lines 22, a pump assembly 24, a control valve 26, a nozzle valve 28, and a nozzle tip 30. Pressurized fuel is supplied to the pump assembly 24 through a fuel inlet 32 fluidly connected to a fuel passageway or line 34, which is in turn fluidly connected to a fuel tank or reservoir 36. A pair of fuel filters 40, 42 are provided in the fuel line 34, and the fuel is pressurized to a relatively low pressure, such as 410 kPa (60 psi) by a transfer pump 44.

The relatively low pressure fuel supplied to the pump assembly 24 via the fuel passageway 34 is periodically pressurized to a relatively high injection pressure, such as 210,000 kPa (30,000 psi), by a plunger 48 which is mechanically connected to an engine cam 50 via a rocker arm 52. The nozzle valve 28 is fluidly connected to the pump assembly 24 via a fuel passageway 56 and is fluidly connected to the nozzle tip 30 via a fuel passageway 58. The nozzle valve 28 operates as a check valve which opens when the fuel provided to it by the pump assembly 24 reaches a relatively high threshold pressure, such as 34,200 kPa (5,000 psi), and closes when the fuel pressure falls below the threshold pressure.

The fuel pressurization provided by the pump assembly 24 is controlled by the control valve 26, which is fluidly connected to the pump assembly 24 via a fuel passageway 60. When the control valve 26 is in its open position, as shown in FIG. 1, fuel may exit the pump assembly 24 via the passageway 60, through a fuel outlet 62 formed in the fuel injector body 22, and through a fuel passageway or line 64 which drains into the fuel reservoir 36, thus preventing the fuel within the pump assembly 24 from being pressurized to the injection pressure by the plunger 48. When the control valve 26 is closed, fuel may not exit the pump assembly 24 via the fuel passageway 60, and thus the fuel may be pressurized by the plunger 48.

The opening and closing of the control valve 26 is controlled by an engine control module ("ECM") 70 connected to it by an electrical line 72. The engine control module 70 is connected to a cam-position sensor 74 which senses the position of the cam 50 and generates a cam-position signal on a line 76 connected to the engine control module 70. In response to the cam-position signal, the engine control module 70 generates electrical power on the line 72 to periodically open and close the control valve 26, which is solenoid-actuated, to cause fuel to be periodically injected into the cylinder 16.

The operation of the fuel injection system 10 is described below in connection with one injection cycle. To begin fuel injection, the control valve 26 is moved from its open position, as shown in FIG. 1, to its closed position, which prevents fuel from exiting the pump assembly 24 via the fuel passageway 60. After the control valve 26 is closed, the rocker arm 52 drives the plunger 48 downwards, which increases the pressure of the fuel within the pump assembly 24 and the pressure of the fuel provided to the nozzle valve 28. When the fuel pressure in the nozzle valve 28 reaches the relatively high threshold pressure, the nozzle valve 28 opens and fuel is injected from the nozzle 30 into the cylinder 16.

When fuel injection is to be ended, the control valve 26 is moved from its closed position to its open position.

As a result, pressurized fuel exits the pump assembly 24 through the fuel passageways 60, 62, causing the fuel pressure in the pump assembly 24 and in the nozzle valve 28 to decrease. When the fuel pressure in the nozzle valve 28 falls below the threshold pressure, the nozzle valve 28 closes, thus terminating the injection of fuel into the cylinder 16.

Figure 2:
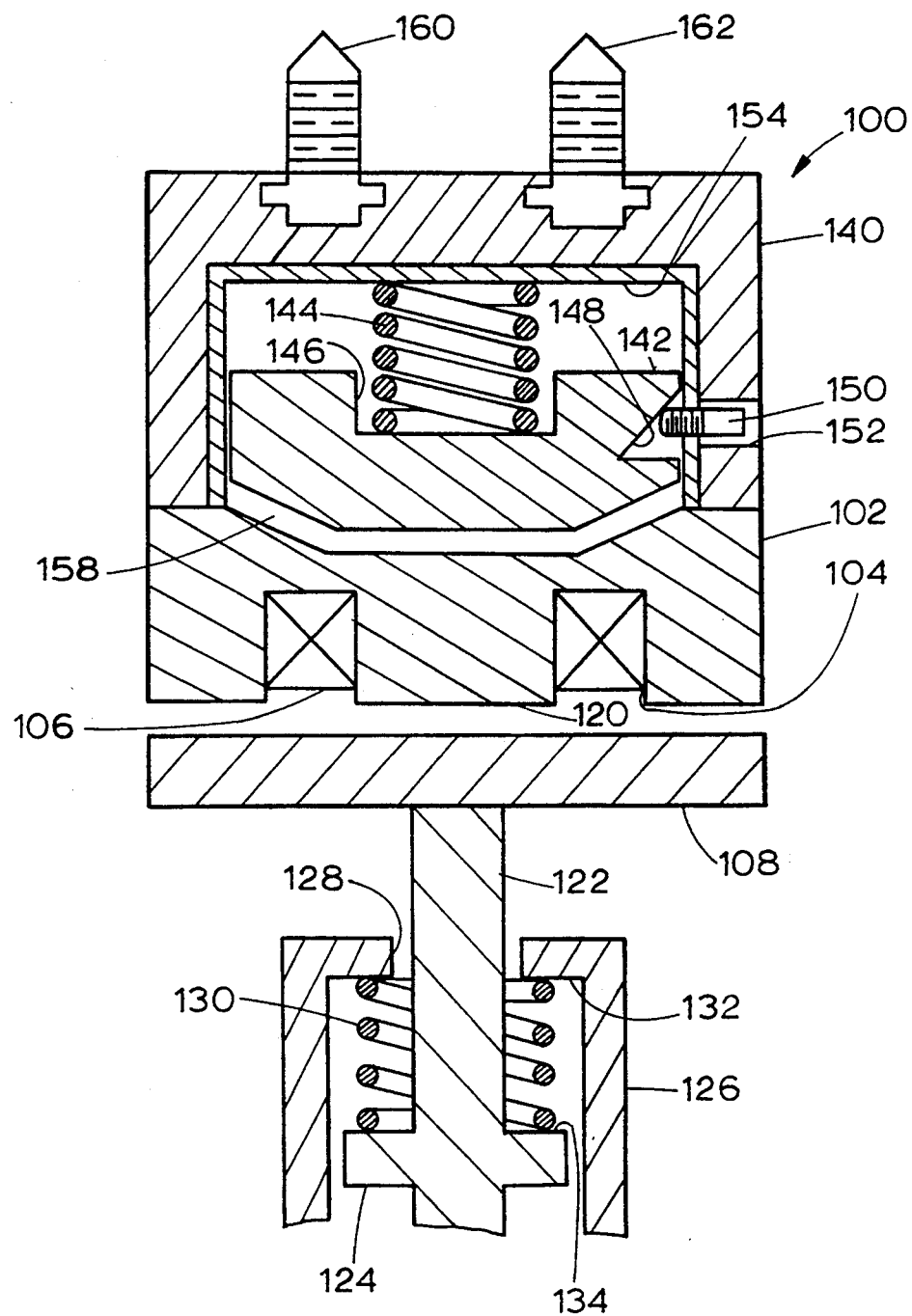
FIG. 2 is a partial cross-sectional view of a solenoid actuator for the electronic control valve shown schematically in FIG. 1.

A cross-section of a solenoid actuator 100 for actuating the control valve 26 is illustrated in FIG. 2. The actuator 100 includes a generally cylindrical pole member 102 with an annular recess 104 formed therein. An electromagnetic device, such as an energizable winding or wire coil 106, is disposed within the recess 104. A generally flat, cylindrical armature 108 is shown spaced apart from the bottom face 120 of the pole member 102. The armature 108 is supported by a rod or valve stem 122 which may be connected to it by any conventional means, such as a bolt (not shown). The valve stem 122 has an annular extension or disk 124 integrally formed with it. A generally cylindrical housing member 126 has a bore 128 through which the valve stem 122 passes. The housing member 126 encloses a portion of the valve stem 122, the disk 124, and a spring 130 disposed between a lower face 132 of the housing member 126 and the upper face 134 of the disk 124 to bias the armature 108 away from the lower face 120 of the pole member 102.

A housing 140 is disposed above the pole member 102, and a second pole member 142 is disposed within the housing 140. The second pole member 142 is spring-biased downwards via a spring 144 provided in a cylindrical bore 146 formed in the upper portion of the second pole member 142. The vertical dimension of the pole member 102 above the wire coil 106 is preferably selected so that the central horizontal area of the pole member 102 above the coil 106 is magnetically saturated when electric current is provided to the wire coil 106.

The second pole member 142 has a V-shaped slot formed therein with an angled surface 148. An adjustment screw 150 is provided in a cylindrical bore 152 in the housing 140. The adjustment screw 150 is threaded into an interior housing member 154, which is composed of a non-magnetic material. The end of the adjustment screw 150 makes contact with the angled surface 148 of the second pole member 142, and the combination of the spring 144 and the adjustment screw 150 anchors or maintains the second pole member 142 in a fixed position relative to the first pole member 102. As shown in FIG. 2, the second pole member 142 is spaced from the first pole member 102 to create an air gap 158 between the two components. The central portion of the air gap 158 is planar in shape, and a perimeter portion of the air gap 158 is frusto-conical in shape.

A pair of electrical contact members 160, 162 which are electrically connected to (not shown) the wire coil 106 are disposed in the upper portion of the housing 140. The electrical contact members 160, 162 facilitate electrical energization of the coil 106 via the line 72 shown in FIG. 1. The pole members 102, 142 and the armature 108 are preferably formed of silicon iron.

When the solenoid actuator 100 of FIG. 2 is incorporated in the control valve 26, the pole member 102 and the housing 126 would be stationary with respect to each other, and the armature 108 and the valve stem 122 would reciprocate up and down in the vertical direction. A valve element, such as a poppet, in the control valve 126 would be connected to the end of the valve stem 122, and the poppet would be movable with respect to a valve seat in the control valve 126, so that the control valve 126 would be opened and closed by reciprocation of the stem 122. The structural details of the valve element and valve seat of the control valve 126 are not considered important to the invention.

In operation, the solenoid actuator 100 has two states or positions, a first or actuated position in which the armature 108 is spaced from the lower face 120 of the pole member 120 by a relatively small distance, and a second or non-actuated position in which the armature 108 is spaced from the lower face 120 of the pole member 102 by a relatively large distance.

To actuate the solenoid 100, the wire coil 106 is energized by passing electric current through it in a direction to attract the armature 108 towards the pole member 102. When the attractive force overcomes the spring pre-load force of the bias spring 130, the armature 108 moves upward towards the lower surface 120 of the pole member 102, causing the control valve 26 to change positions, for example, from open to closed.

To deactuate the solenoid 100, the electric current previously generated in the wire coil 106 is terminated, and consequently the armature 108 is urged away from the lower face 120 by the bias spring 130, thus causing the control valve 126 to change positions, for example, from closed to open.

The provision of the second pole member 142 above the pole member 102 to create the adjustable air gap 158 is advantageous in that it allows adjustment of the magnitude of the attractive magnetic force generated on the armature 108 when the wire coil 106 is energized. When the width of the air gap 158 is increased, less magnetic flux is generated in the second pole member 142, and consequently the attractive force between the pole member 102 and the armature 108 is decreased. Similarly, when the width of the air gap 158 is decreased, more magnetic flux is generated in the second pole member 142, and the attractive force between the pole member 102 and the armature 108 is increased.

It should be recognized that the actuation speed or response time of the actuator 100, and thus the closing (or opening) speed of the valve 26, depends on the magnitude of the force generated by the solenoid actuator 100, which in turn depends upon the relative distance between the pole member 102 and the second pole member 142.

Initially, prior to each fuel injector 20 being installed in an engine, the response of the control valve 26 of the fuel injector 20 is tuned or adjusted by turning the adjustment screw 150 to adjust the relative position of the pole members 102, 142, and thus the magnetic force generated by the actuator 100. It should be appreciated that the magnetic force is continuously adjustable since the adjustment screw 150 can be turned by any amount. The control valve 26 of each injector 20 to be installed in an engine is tuned so that its response is identical to the control valves 26 of the other fuel injectors 20 to achieve optimal performance of the engine. After each injector 20 is so tuned, its adjustment screw 150 may be locked into place via any conventional means, such as staking, so that it remains locked in the same position throughout the operating life of the engine.

Industrial Applicability

Although the fuel injection system 10 is particularly adapted for use in a diesel-cycle direct-injection internal combustion engine, the fuel injection system 10 may be used with any type of diesel engine, spark ignition engine or any other type of engine where it is necessary or desirable to inject fuel into an ignition chamber.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A solenoid actuator adapted for use in an electronic control valve for a fuel injector, said solenoid actuator comprising:

an electrically energizable electromagnetic device;

a first pole member associated with said electrically energizable electromagnetic device;

an armature movable with respect to said first pole member in a linear direction, said armature occupying a first position relative to said first pole member when said electromagnetic device is not electrically energized and a second position relative to said first pole member when said electromagnetic device is electrically energized;

a second pole member associated with said first pole member, one of said first and second pole members being movable in said linear direction so as to form an air gap of variable width between said first and second pole members, said first and second pole members occupying a relative position between them in which said second pole member is spaced from said first pole member; and biasing means for maintaining said relative position of said first and second pole members.

2. A solenoid actuator as defined in claim 1 wherein said biasing means comprises:

a spring for urging said second pole member towards said first pole member; and adjustable stop means disposed in contact with said second pole member.

3. A solenoid actuator as defined in claim 2 wherein said adjustable stop means comprises a screw.

4. A solenoid actuator as defined in claim 3 wherein said second pole member has an angled surface and wherein said spring urges said angled surface against said screw.

5. A solenoid actuator as defined in claim 1 additionally comprising spring means for biasing said armature away from said first pole member.

6. A solenoid actuator as defined in claim 1 wherein said biasing means is continuously adjustable.

7. An electronically controlled fuel injector comprising:

a fuel injector body;

a nozzle disposed in said fuel injector body;

injection means for causing fuel to be periodically injected by said nozzle;

an electronic control valve disposed in said fuel injector body and operatively coupled to said injection means, said control valve having a first position which causes fuel to be injected by said nozzle and a second position in which fuel is prevented from being injected by said nozzle, said control valve comprising:

an electrically energizable electromagnetic device;

a first pole member associated with said electrically energizable electromagnetic device;

an armature movable with respect to said first pole member in a linear direction, said armature occupying a first position relative to said first pole member when said electromagnetic device is not electrically energized and a second position relative to said first pole member when said electromagnetic device is electrically energized;

a second pole member associated with said first pole member, one of said first and second pole members being movable in said linear direction so as to form an air gap of variable width between said first and second pole members, said first and second pole members occupying a relative position between them in which said second pole member is spaced from said first pole member; and biasing means for maintaining said relative position of said first and second pole members.

8. A fuel injector as defined in claim 7 wherein said biasing means comprises:

a spring for urging said second pole member towards said first pole member; and adjustable stop means disposed in contact with said second pole member.

9. A fuel injector as defined in claim 8 wherein said adjustable stop means comprises a screw.

10. A fuel injector as defined in claim 9 wherein said second pole member has an angled surface and wherein said spring urges said angled surface against said screw.

11. A fuel injector as defined in claim 7 additionally comprising spring means for biasing said armature away from said first pole member.

12. A fuel injector as defined in claim 7 wherein said injection means comprises pump means fluidly connected to a nozzle valve.

13. A fuel injector as defined in claim 7 wherein said biasing means is continuously adjustable.

14. An electronically controlled fuel injector comprising:

a solenoid actuator body;

a fuel inlet formed in said fuel injector body;

pump means disposed in said fuel injector body and being supplied with fuel from said fuel inlet;

a nozzle valve disposed in said fuel injector body and being provided fuel from said pump means, said nozzle valve occupying an open position when said fuel provided by said pump means is above a threshold fuel pressure and a closed position when said fuel provided by said pump means is below a threshold fuel pressure;

an electronic control valve disposed in said fuel injector body and being fluidly connected to said pump means, said control valve having a first position in which fuel in said pump means may be pressurized to said threshold fuel pressure and a second position which prevents fuel in said pump means from being pressurized to said threshold pressure, said control valve comprising:

an electrically energizable electromagnetic device;

a first pole member associated with said electrically energizable electromagnetic device;

an armature movable with respect to said first pole member in a linear direction, said armature occupying a first position relative to said first pole member when said electromagnetic device is not electrically energized and a second position relative to said first pole member when said electromagnetic device is electrically energized;

a second pole member associated with said first pole member, one of said first and second pole members being movable in said linear direction so as to form an air gap of variable width between said first and second pole members, said first and second pole members occupying a relative position between them in which said second pole member is spaced from said first pole member; and biasing means for maintaining said relative position of said first and second pole members.

15. A fuel injector as defined in claim 14 wherein said biasing means comprises:

a spring for urging said second pole member towards said first pole member; and adjustable stop means disposed in contact with said second pole member.

16. A fuel injector as defined in claim 15 wherein said adjustable stop means comprises a screw.

17. A fuel injector as defined in claim 16 wherein said second pole member has an angled surface and wherein said spring urges said angled surface against said screw.

18. A fuel injector as defined in claim 14 additionally comprising spring means for biasing said armature away from said first pole member.

19. A fuel injector as defined in claim 14 wherein said biasing means is continuously adjustable.

* * * * *

UNITED STATES PATENT AND TRADEMARK OFFICE
CERTIFICATE OF CORRECTION

PATENT NO. : 5,449,119

DATED : September 12, 1995

INVENTOR(S) : Dale C. Maley

It is certified that error appears in the above-identified patent and that said Letters Patent is hereby corrected as shown below:

Claim 14, column 7, line 41 "solenoid actuator" should be -- fuel injector--.

Signed and Sealed this

Eleventh Day of June, 1996

Attest:

BRUCE LEHMAN

Attesting Officer       Commissioner of Patents and Trademarks